United States Patent [19]
Dubrovsky

[11] Patent Number: 4,844,019
[45] Date of Patent: Jul. 4, 1989

[54] MOUNTING FOR POULTRY WATERING DEVICE

[76] Inventor: Jack Dubrovsky, 1 Fair Haven Rd., Rumson, N.J. 07760

[21] Appl. No.: 164,196

[22] Filed: Mar. 4, 1988

[51] Int. Cl.⁴ ............................................. A01K 7/00
[52] U.S. Cl. ..................................................... 119/75
[58] Field of Search .................. 119/72, 72.5, 18, 74, 119/75

[56] References Cited

U.S. PATENT DOCUMENTS

| | | | |
|---|---|---|---|
| 445,415 | 1/1891 | Vahle | 119/18 |
| 1,616,223 | 2/1927 | Hooey | 119/18 |
| 2,773,473 | 12/1956 | Martin | 119/18 |
| 4,444,149 | 4/1984 | Shomer | 119/18 |
| 4,669,421 | 6/1987 | Flintjer | 119/18 |

FOREIGN PATENT DOCUMENTS 621319  1/1935  Fed. Rep. of Germany ........ 119/18

*Primary Examiner*—Gene Mancene
*Assistant Examiner*—R. Thomas Price
*Attorney, Agent, or Firm*—Arthur L. Plevy

[57] ABSTRACT

An improved mounting bracket for a poultry watering cup comprises a substantially flat body section extending in opposite lateral directions and vertical directions from a holding slot for the watering cup. The body section has opposite upper edges inclined laterally outwardly and vertically upward from the central position of the holding slot, and has a pair of upper hooks each positioned at an upper end of a respective one of the upper edges. The positions of the upper hooks are in an upstream direction from the direction that fluid would flow, thereby preventing the fluid from accumulatng on and corroding the fence to which the hooks are attached.

4 Claims, 2 Drawing Sheets

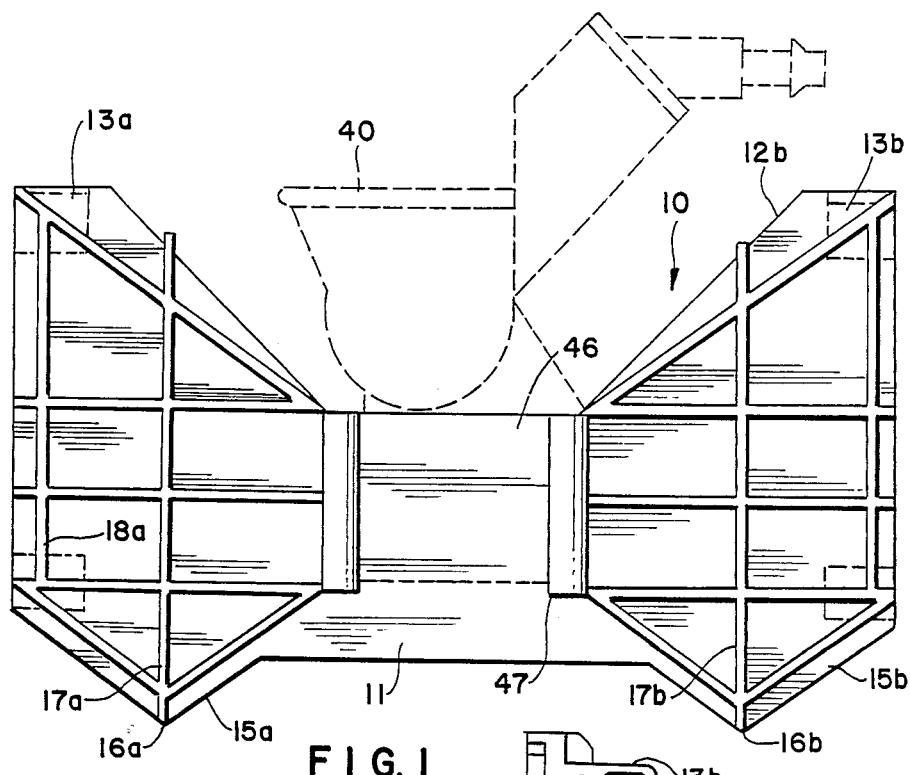
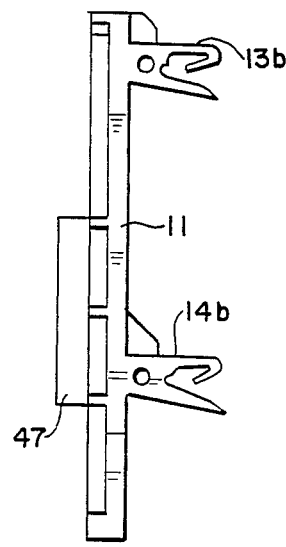
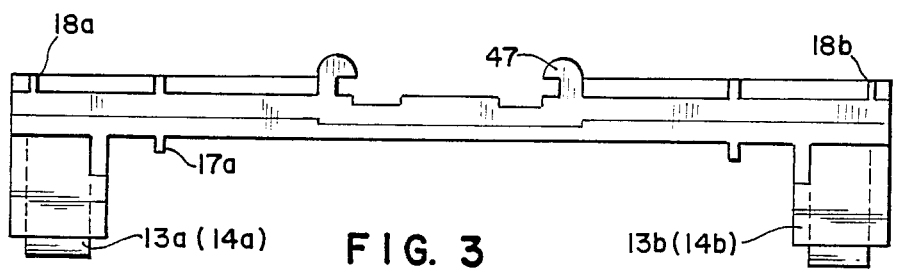

MOUNTING FOR POULTRY WATERING DEVICE

FIELD OF THE INVENTION

This invention relates to an improved mounting for a poultry watering device of the type including a cup and valve assembly operable to continuously replenish the cup, wherein the cup is attached by a mounting bracket to an open wire fence or cage.

BACKGROUND OF THE INVENTION

On example of a well-known poultry watering device is disclosed in U.S. Pat. No. 4,444,149 issued to Y. Shomer entitled Poultry Watering Device which issued on Apr. 24, 1984. This device, as shown in FIG. 5, has a cup in which the tip 41 of a valve assembly 42 is positioned in an angled sleeve 43 at one side of the cup, and is connected by a stem 44 to a water supply line 45. The cup has a lower plate 46 extending downward from the bottom thereof which is inserted in a holding slot 47 of a mounting bracket 48 having a hook shown in the patent in FIG. 6a for hanging the cup and valve assembly sidewards from a wire cage or fence 50. Part of the fence wire 51 is removed to make room for the head of the poultry to be positioned over the cup.

Devices as shown in the prior art operate with cages having an opening 51. The wires used to form the cages as 52 are joined together by a weld or a solder joint 53. This can adversely affect the galvanization and leave the joint or wires subject to oxidation. Hence water and other matter such as mash can and does contact these wire areas to cause additional oxidation and corrosion. As one can understand the process will worsen based on old wire cages where oxidation has already begun and wire with lesser galvanization. Furthermore the bracket shown in U.S. Pat. No. 4,444,149 forms a ledge or a shelf to enable mash or water to accumulate.

Another type of bracket has been provided to correct the above problem having a pair of hooks extending horizontally toward the fence in order to hold the cup and lower plate a short distance away from the fence. Also, the hooks on the bracket are spaced laterally apart on each side of the cup in order to distance their point of attachment to the fence from the vicinity of substances spilled by the poultry. However, this mounting bracket has the problem that fluid substances still tend to flow laterally on the top surfaces of the bracket to the hooks and thereby corrode the portions of the fence to which they are attached. Fluid and mash combinations also flow vertically and are directed to the lower attachments by means of this bracket.

SUMMARY OF THE INVENTION

The purpose of the invention is to provide an improved mounting bracket for a poultry watering device of the above-mentioned type which can prevent or substantially reduce corrosion of the fence to which it is attached.

In accordance with the invention, the mounting bracket comprises a substantially flat body section extending in opposite lateral directions and vertical directions from a holding slot for a watering cup which is disposed at a central portion on one side surface of the body section. The body section has opposite upper edges at symmetric inclined angles extending laterally outwardly and vertically upward from the central position of the holding slot, and has a pair of upper hooks each positioned at an upper end of a respective one of the upper edges. The positions of the upper hooks are in an upstream direction from the direction that fluid would flow by gravity down the upper edges, thereby preventing the fluid from accumulating on and corroding the fence to which the hooks are attached.

Further features of the invention include a pair of lower hooks each positioned at a lateral end of a respective one of a pair of lower edges of the body section. The lower edges are formed symmetrically each having a V-shape with its point converging downwardly at a position between the holding slot and the lateral end of the lower edge, so that fluid is channeled downward away from the end positions of the lower hooks. Vertical ridges are also formed between the central position of the holding slot at the end positions of the hooks. The ridges project a given distance from the upper edges and the side surfaces of the body section for blocking or inhibiting the flow of fluid to the end positions of the hooks.

BRIEF DESCRIPTION OF THE FIGURES

The above objects and advantages and further features of the invention are described in detail below in conjunction with the drawings, of which:

FIG. 1 is a front view of an improved mounting bracket for a poultry watering device in accordance with the invention;

FIG. 2 is a cross-sectional side view of the bracket of FIG 1;

FIG 3 is a cross-sectional bottom view of the bracket of FIG. 1;

DETAILED DESCRIPTION OF THE INVENTION

Figure 4:
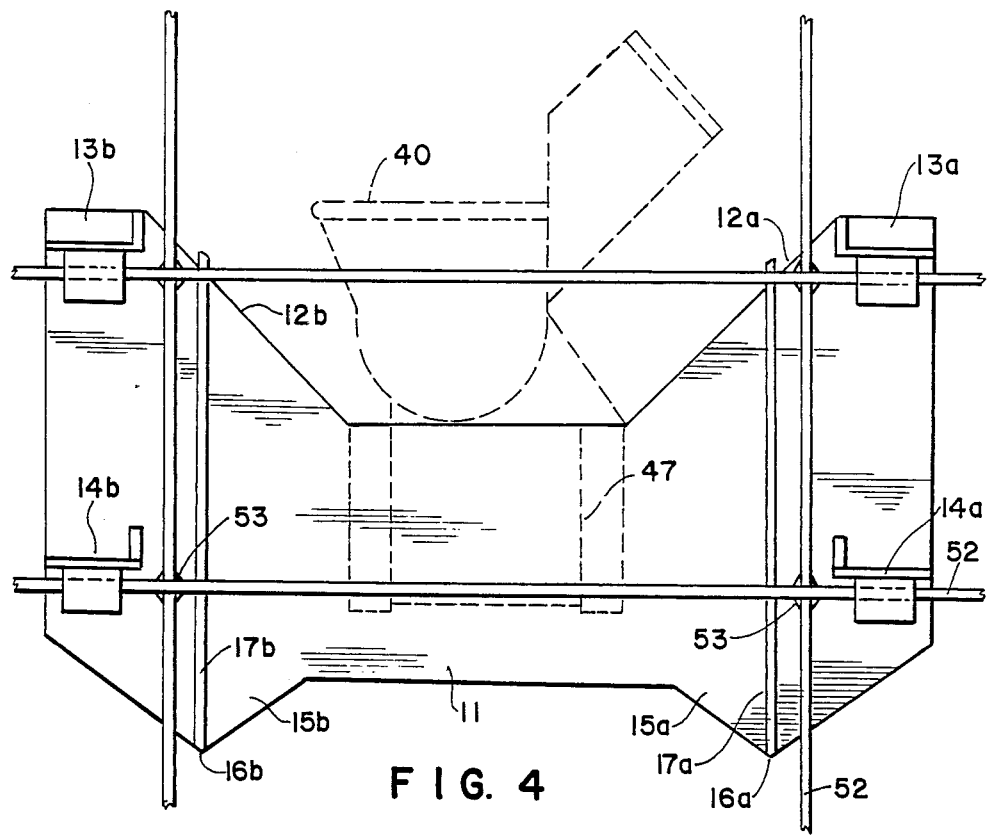
FIG. 4 is a rear view showing the bracket mounted to a wire fence.
Figure 5:
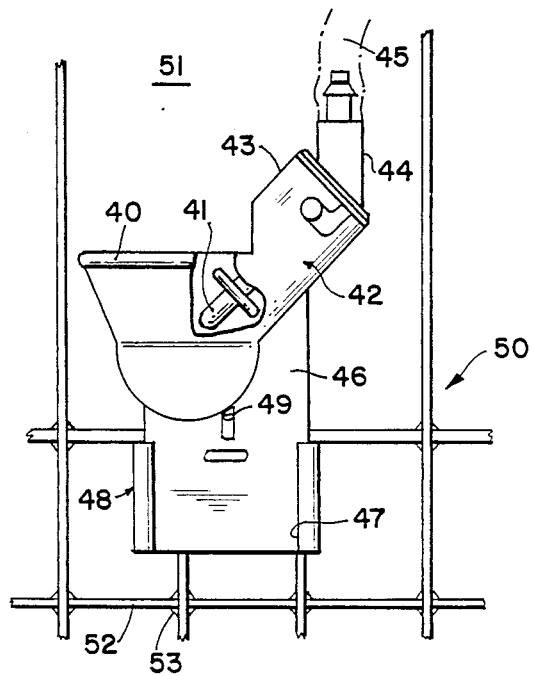
FIG. 5 is a perspective view showing a conventional poultry watering device and mounting bracket.

Referring to FIG. 1, an improved mounting bracket 10 has a substantially flat body section 11 which extends in opposite lateral directions and vertical directions from the holding slot 47 in which the mounting plate 46 of the conventional watering cup 40 is inserted. The holding slot 47 is disposed at a central position on one side surface of the body section 11. The body section 11 has opposite upper edges 12a, 12b at symmetric inclined angles extending laterally outwardly and vertically upward from the central position of the holding slot 47.

A pair of upper hooks 13a, 13b are located on the opposite side surface of the body section from the holding slot, as shown more clearly in FIG. 3. Each hook is positioned at an upper end of a respective one of the upper edges 12a, 12b, respectively. The positions of the upper hooks 13a, 13b are in an upstream direction from the direction that fluid would flow by gravity down the upper edges 12a, 12b, thereby preventing the fluid and mash from accumulating on and corroding the fence to which the hooks are attached.

A pair of lower hooks 14a, 14b are positioned vertically below the upper hooks on each lower end in the lateral direction of the body section. Both the lower and upper hooks assure that the bracket is spaced from the wire cages as is the cup 40. It is also important to note that the hooks are fabricated so that the bracket once secured to the cage can slide or be moved small distances in the horizontal direction as determined by the location of the vertical wires. This movement cleans the wire as the bracket moves preventing excessive build-up and thereby decreasing the possibility of oxidation. The body section 11 also has lower edges 15a, 15b formed symmetrically on each lower side of the holding slot 47 having a V-shape with its point 16 a, 16b converging downwardly at a position between the holding slot 47 and the lateral end positions of the lower hooks, so that fluid is channeled downward away from the end positions of the lower hooks.

Vertical ridges 17a, 17b and 18a, 18b are also formed between the central position of the holding slot 47 and the end positions of the hooks 13a, 13b and 14a, 14b. The ridges project a short distance from the upper edges and the opposite side surfaces of the body section for blocking or inhibiting the flow of fluid to the end positions of the hooks.

Referring to FIG. 4, the above-described mounting bracket is shown attached to the wires of a fence from the opposite side of the body section 11. Because of the inclined upper edges 12a, 12b, the cup 40 is effectively positioned with the bulk of its bowl at a lower level than the upper hooks. Thus fluid splashed onto the upper edges 12a, 12b would flow downward toward the cup and away from the upper hooks. The points 16a, 16b of the lower edges 15a, 15b also divert fluid away from the lower hooks 14a, 14b. The vertical ridges 17a, 17b act as a barrier to the flow of the fluid toward the hooks. Thus the fluid tends to be confined to and/or diverted toward the central position of the holding slot and corrosion of the fence at the positions where the hooks are attached is avoided or substantially reduced.

The specific embodiments of the invention described above are intended to be illustrative only and many other variations and modifications may be made thereto in accordance with the principals of the invention. All such embodiments and variations and modifications thereof are considered to be within the scope of the invention, as defined in the following claims.

I claim:

1. An improved mounting bracket for a poultry watering device, of the type having a cup, a valve assembly positioned to admit water in the cup, and a mounting plate extending vertically downward from a lower portion of the cup for mounting the cup to the mounting bracket, comprising:
    a substantially flat body section extending in opposite lateral directions and vertical directions from a holding slot which is disposed at a central position on one side surface of the body section, wherein the mounting plate of the cup is inserted in said holding slot to mount the cup to said mounting bracket;
    a pair of upper edges extending on respective opposite lateral sides of the body section at symmetric inclined angles laterally outwardly and vertically upward from the central position of the holding slot; and
    a pair of upper hooks each positioned at an upper end of a respective one of the upper edges, wherein the positions of the upper hooks are in an upstream direction from the direction that fluid would flow by gravity down the upper edges, thereby preventing the fluid from accumulating on and corroding a fence to which the hooks of said mounting bracket are attached.

2. An improved mounting bracket according to claim 1, wherein said body section further includes a pair of lower hooks each positioned vertically below a respective one of said upper hooks and at opposite lateral ends of a lower portion of the body section.

3. An improved mounting bracket according to claim 2, wherein said body section further includes a pair of lower edges formed symmetrically on respective lateral sides of said holding slot, each having a V-shape with its point converging downwardly at a position between the holding slot and a lateral end of the lower edge, so that fluid is channeled downward away from the end positions of the lower hooks.

4. An improved mounting bracket according to claim 1, wherein said body section further includes a pair of vertical ridges formed on respective opposite lateral sides of said holding slot, each being positioned between the central position of the holding slot and the positions of the upper hooks, wherein said vertical ridges project a given distance from the upper edges and opposite side surfaces of the body section for blocking or inhibiting the flow of fluid to the positions of the upper hooks.

* * * * *